US012803260B2

(12) United States Patent
Shin

(10) Patent No.: US 12,803,260 B2
(45) Date of Patent: Nov. 17, 2026

(54) ELEVATING CABLE REEL OF SINGLE-LAYER WINDING TYPE

(71) Applicants: REEL TECH CO., LTD., Suncheon-si (KR); Jeong Hoon Shin, Suncheon-si (KR)

(72) Inventor: Jeong Hoon Shin, Suncheon-si (KR)

(73) Assignees: REEL TECH CO., LTD., Jeollanam-Do (KR); Jeong Hoon Shin, Jeollanam-Do (KR)

( * ) Notice: Subject to any disclaimer, the term of this patent is extended or adjusted under 35 U.S.C. 154(b) by 525 days.

(21) Appl. No.: 18/548,926

(22) PCT Filed: Mar. 2, 2022

(86) PCT No.: PCT/KR2022/002960
§ 371 (c)(1),
(2) Date: Sep. 5, 2023

(87) PCT Pub. No.: WO2022/196980
PCT Pub. Date: Sep. 22, 2022

(65) Prior Publication Data

US 2024/0154400 A1 May 9, 2024

(30) Foreign Application Priority Data

Mar. 16, 2021 (KR) ........................ 10-2021-0034316
Mar. 16, 2021 (KR) ........................ 10-2021-0034320

(51) Int. Cl.
*H02G 11/02* (2006.01)
*A63F 5/04* (2006.01)
*H02G 3/30* (2006.01)

(52) U.S. Cl.
CPC ............... *H02G 11/02* (2013.01); *A63F 5/04* (2013.01); *H02G 3/30* (2013.01)

(58) Field of Classification Search
CPC . H02G 3/30; H02G 11/02; A63G 5/04; A63G 5/045; H01R 4/28; H01R 4/30
(Continued)

(56) References Cited

U.S. PATENT DOCUMENTS 5,280,880 A * 1/1994 Ewing ..................... B65B 11/08 254/294
2013/0032654 A1* 2/2013 Tracey ..................... H02G 3/02 242/390.8

FOREIGN PATENT DOCUMENTS

EP 0788820 A2 8/1997
JP H06153364 A * 5/1994
(Continued)

OTHER PUBLICATIONS

International Search Report mailed Jun. 23, 2022 for PCT/KR2022/002960.

*Primary Examiner* — S. Joseph Morano
*Assistant Examiner* — Heaven R Buffington
(74) *Attorney, Agent, or Firm* — CANTOR COLBURN LLP

(57) ABSTRACT

The present invention disclosed a elevating cable reel of single-layer winding type comprising; a main body installed on a ceiling or wall or a support of a predetermined shape and having a storage space therein; a drum rotatably accommodated inside the main body, and having a hollow therein, and a power cable being wound around a circumferential surface thereof; a driving motor disposed in the hollow to provide forward/reverse rotational force to the drum; a slip ring installed on a part of the drum to receive commercial power in a contact manner; and an elevating body suspended from the lower end of the power cable and installed to be elevated up and down. And, the power cable is wound in a
(Continued)

single layer on the circumferential surface of the drum to prevent heat generation due to eddy current.

3 Claims, 14 Drawing Sheets

(58) Field of Classification Search
USPC ........ 191/12, 12.2, 12.4; 248/317, 323, 327, 248/328, 329; 242/389, 390, 390.1, 397, 242/398; 362/387
See application file for complete search history.

(56) References Cited

FOREIGN PATENT DOCUMENTS

| | | | | |
|---|---|---|---|---|
| JP | 2000037026 | A | | 2/2000 |
| JP | 2005524999 | A | | 8/2005 |
| JP | 2006116114 | A | | 5/2006 |
| JP | 2011223699 | A | * | 11/2011 |
| KR | 100880020 | B1 | | 1/2009 |
| KR | 20090041383 | A | | 4/2009 |
| KR | 101033808 | B1 | * | 5/2011 |
| KR | 101033809 | B1 | | 5/2011 |
| KR | 101073683 | B1 | | 10/2011 |
| KR | 20120007157 | U | | 10/2012 |
| KR | 20140000159 | U | | 1/2014 |
| KR | 101530169 | B1 | | 6/2015 |
| KR | 101659980 | B1 | | 9/2016 |
| KR | 101921684 | B1 | | 11/2018 |
| KR | 102081676 | B1 | | 4/2020 |
| KR | 102204344 | B1 | | 1/2021 |

* cited by examiner

ELEVATING CABLE REEL OF SINGLE-LAYER WINDING TYPE

TECHNICAL FIELD

The present application claims priorities based on Korean Patent Application No. 10-2021-0034316 and Korean Patent Application No. 10-2021-0034320 filed on Mar. 16, 2021, and all contents disclosed in the specifications and drawings at filing of the patent applications are incorporated herein.

The present invention relates to an elevating cable reel of single-layer winding type, and more particularly, to an elevating cable reel of single-layer winding type that is installed on a ceiling or wall etc., to wind or unwind a power cable in order to lift up or down the power cable.

BACKGROUND ART

An electrical outlet is a device for supplying electric power by being combined with a plug connected to various home appliances or electric appliances, and is usually installed in a buried type such as a ceiling or a wall of various facilities.

In multi-use facilities such as schools, restaurants, cafes, and pubs, electrical appliances are used in multiple places within a limited space at the same time, so a large number of outlets are installed on the ceiling, wall, or floor of the room, and a power strip is connected to the outlet if necessary, and a method of branching the power cable to a number of places is also commonly used.

In recent years, as a use of portable electronic devices such as cell phones, laptops, touch pads, etc. has become common, it is common to see portable electronic devices connected to outlets and charged in multi-use facilities.

However, the use of outlets in such multi-use facilities is complicated by wiring along the wall or floor of the room, which makes the interior aesthetically unsightly, and it is inconvenient to plug or unplug electrical appliance plugs from the outlet. In addition, there is a risk of safety accidents such as tripping on cables and falling.

As an alternative, a technique of installing a cable reel on a ceiling or wall and connecting an outlet to an end of the cable to be able to move up and down has been proposed.

For example, Korean Patent Registration No. 10-1530169 discloses an elevating device for a cable reel outlet in which wires can be laminated and wound in the longitudinal direction to prevent tangle or twisting of wires. In the cable reel outlet elevating device, a first winding unit and a second winding unit are rotated by a power supply (motor), and a main power supply line and a outlet power supply line can continuously supply power even during rotation for winding or unwinding, and a diameter of the first winding unit is smaller than a diameter of the second winding unit, and an unwound length of the outlet power supply line is longer than an unwound length of the main power supply line.

However, the conventional elevating device for the cable reel outlet has limitations in downsizing due to the structure in which the motor providing rotational force and the cable winding unit are disposed at a predetermined distance from each other, and has problems in that a center of gravity is biased to one side, making it difficult to stably elevate the outlet.

In addition, there is a disadvantage in that a configuration for preventing the main power supplying cable from being tangled when the winding unit rotates is complicated, so an alternative is required.

In addition, since the conventional cable reel is configured so that the power cable is wound on the drum several times in multiple layers, eddy current is induced between the cables adjacent to the upper and lower layers when the power is supplied, resulting in heat generation and a fire.

Meanwhile, game props such as darts, betting spin boards, and dice are commonly used when having a dinner at work or various gatherings or enjoying leisure activities such as picnics and camping.

However, the props for games are generally used for one-time use and are often thrown away, and game devices such as darts and betting spinners are relatively bulky, so they are not portable, and they occupy space even after the use ends, which spoils an aesthetics of an interior.

As an alternative, Korean Patent Registration No. 10-1921684 proposes a portable roulette device that is rotatable while being inserted into various types of containers or bottles and has improved portability. Specifically, Korean Patent Registration Publication No. 10-1921684 discloses the portable roulette device comprising a holding part formed so that an inner space is opened toward a top, an indicator part having a lower rotating axis and an indicator tip, the lower rotating axis being detachably coupled to the holding part and the upper part of the indicator tip being extruded to a predetermined position and a battery embedded therein, and a display part having a light emitting unit that emits light by the battery, and the display part is rotatably coupled to the outer surface of the rotating axis between the holding part and the indicator part. In a state in which the holding part, the indicator part and the display part are combined, a part of the holding part protrudes toward the lower part of the display part so that the part of the holding part is located in a different horizontal line. And, when a side surface of the display part is pushed toward one direction in a state in which a part of the holding part is inserted into a lid of the container or bottle, the display part rotates based on the rotation axis.

However, since the portable roulette device as described above is a personal portable device, it is inappropriate to be installed in multi-use facilities such as restaurants, cafes, and pubs and used by several people at the same time.

DISCLOSURE

Technical Goal

The present invention was devised to solve the above problems, and an object of the present invention is to provide an elevating cable reel of single-layer winding type that can be used for elevating an elevating body by hanging the elevating body at the end of a power cable and has a structure capable of minimizing an occurrence of eddy currents between power cables.

Another object of the present invention is to provide an elevating cable reel of single-layer winding type capable of downsizing the elevating cable reel by improving a coupling relationship between a drum and a driving motor housed in a main body.

Another object of the present invention is to provide an elevating cable reel of single-layer winding type capable of accurately detecting an amount of rotation of the drum and an unwinding length of the power cable by winding the power cable on an outer circumferential surface of the drum at a constant pitch.

Another object of the present invention is to provide an elevating cable reel of single-layer winding type having a structure in which an electric outlet or a rotating game machine is fused with the elevating body.

Technical Solution

In order to achieve the above objects, the present invention provides an elevating cable reel of single-layer winding type characterizing in that comprising a main body installed on a ceiling or wall or a support of a predetermined shape and having a storage space therein; a drum rotatably accommodated inside the main body, and having a hollow therein, and a power cable being wound around a circumferential surface thereof; a driving motor disposed in the hollow to provide forward/reverse rotational force to the drum; a slip ring installed on a part of the drum to receive commercial power in a contact manner; and an elevating body suspended from the lower end of the power cable and installed to be elevated up and down. The power cable is wound in a single layer on the circumferential surface of the drum to prevent heat generation due to eddy current.

Preferably, a final turn of the power cable is aligned with a center of the main body in a state in which the power cable is completely wound around the drum, and a center of the elevating body coincides with the center of the main body in a state in which an elevation of the elevating body is completed by winding of the power cable and coupled to a lower part of the main body.

A guide groove accommodating a part of an outer circumferential surface of the power cable is formed on the circumferential surface of the drum to spirally extend along a longitudinal direction of the drum so as to wind the power cable at a constant pitch.

At least one location of the guide groove can be formed with a position adjusting hole that communicates with the hollow of the drum and serves as a starting point for winding the power cable around the circumferential surface of the drum.

In order to select a starting point of the winding on the circumferential surface of the drum in response to an entire length of the power cable, a plurality of position adjusting holes are alternately formed for the guide grooves that are repeated in the longitudinal direction of the drum.

In order to secure a rigidity of the drum, the position adjusting holes are formed to be staggered manner in multiple directions with respect to a rotation center axis of the drum.

In addition, the elevating cable reel of single-layer winding type may comprises at least one guide roll fixed to an inner bottom surface of the main body and disposed below the drum to guide the power cable unwound from the drum to below of the main body.

The elevating cable reel of single-layer winding type may further comprise a microcomputer that detects a tension applied to the power cable to detect a no-load state or an overload state to automatically stop an operation of the driving motor.

The microcomputer may further perform a slow section control to prevent an impact between the main body and the drum by reducing a rotational speed of the drum before the elevating body engages with the main body.

The microcomputer may further perform an automatic stop control to stop an operation of the driving motor by detecting a predetermined height when the elevating body ascends or descends.

The elevating body may be configured with an outlet provided with at least one plug insertion hole.

The elevating cable reel of single-layer winding type may further comprise a storage unit installed in at least one side of the elevating body to optionally open an internal storage space thereof.

In addition, the elevating cable reel of single-layer winding type may further comprise a multi-purpose shelf connected to both side surfaces of the elevating body by pivots to be disposed below the elevating body, and the multi-purpose shelf has a storage surface on an upper surface thereof where an object can be placed.

A cable hole into which the power cable can be inserted is formed at a center of the elevating body, and a plurality of compression blocks are disposed around the cable hole to surround the power cable from all sides. The power cable is fixed to the elevating body as the power cable is pressed by the compression blocks being pushed in the direction of the power cable by bolts selectively inserted to contact with an outer surface of the compression blocks.

As an alternative, the elevating body is composed of an elevating main body suspended on a lower end of the power cable, and a rotating game device. The rotating game device comprises a rotating plate configured to be rotated on one surface of the elevating main body, and the rotating plate has betting areas distinguished from each other and partitioned in the circumferential direction by at least one selected from among texts, numbers, images, and colors.

Advantageous Effects

The elevating cable reel of single-layer winding type according to the present invention has the following effects.

First, since the power cable is wound around the drum in a single layer, it is possible to prevent eddy currents from being induced between adjacent cables. Therefore, even if electricity is used while all or part of the power cable is wound around the drum, substantially the same electrical safety effect as when the power cable is completely unwound from the drum and used can be obtained.

Second, a final turn of the power cable is positioned on a same vertical line as a center of the main body when the power cable is wound around the drum completely, and when the lift is completed, the center of the elevating body is precisely aligned with the center of the main body, so that and the elevating cable reel can be compactly configured overall and the interior aesthetics can be maximized.

Third, since the drive motor and the gear unit are arranged in the hollow of the drum to rotate the cable reel, the cable reel can be downsized compared to the device of the prior art in which the drive motor and the gear unit are installed outside the drum.

Fourth, since commercial power is transmitted to the power cable in a contact method by a slip ring, a tangle of the power cable when the drum rotates can be prevented and the power transmission structure can be simplified.

Fifth, the power cable can be wound around the circumference of the drum at a constant pitch, and by selecting the starting point of the winding, the power cable can be set to finish the winding at the center of the drum when the elevation of the elevating body completes. Therefore, it is possible to prevent a load applied to the drum from being biased to one side.

Sixth, since a plurality of positioning holes are formed to be staggered from each other on both sides of the drum's axis of rotation, it is possible to prevent the drum from deteriorating in rigidity.

Seventh, when no load or overload is detected in the driving motor, the operation of the driving motor is automatically stopped to prevent safety accidents.

Eighth, by installing a rotating game device on the ceiling of a multi-use facility, people can enjoy the game independently at each table, and after the game is over, the game device elevating body can be elevated to the ceiling to increase the efficiency of space use and improve the interior aesthetics.

Ninth, by detecting the rotational speed of the rotating plate and controlling the deceleration pattern, more diverse game or event services can be provided.

BEST MODE

Figure 1:
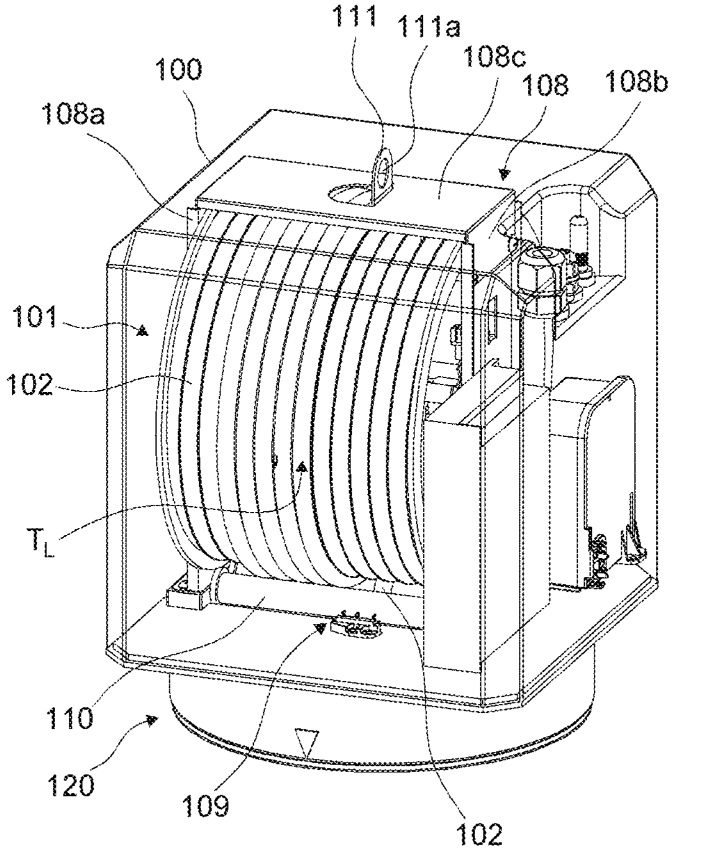
FIG. 1 is a see-through perspective view of an elevating cable reel of single-layer winding type according to a preferred embodiment of the present invention.
Figure 2:
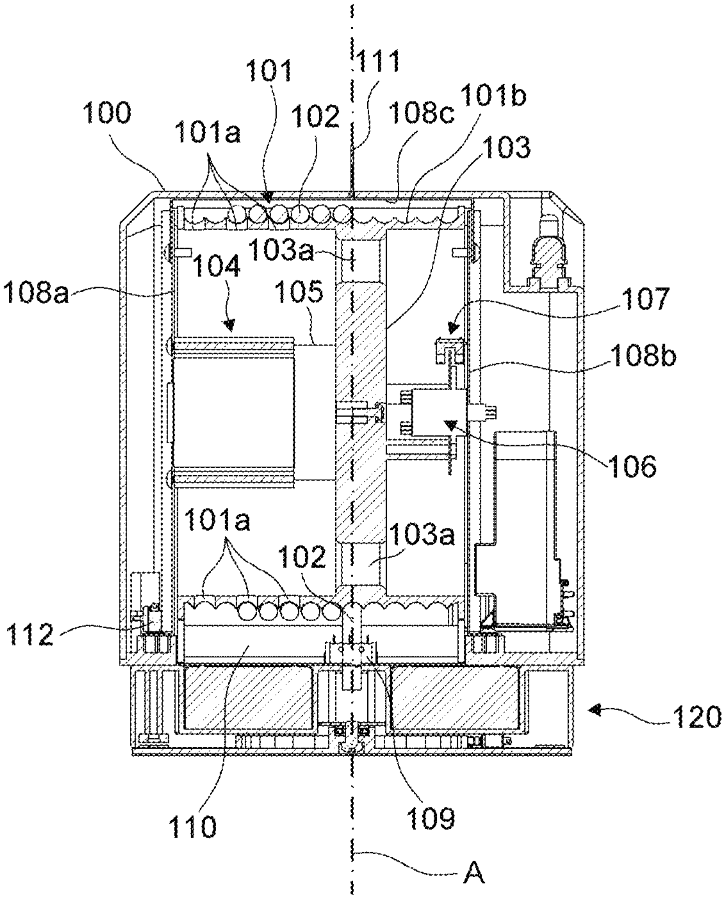
FIG. 2 is a cross-sectional view of FIG. 1.
Figure 3:
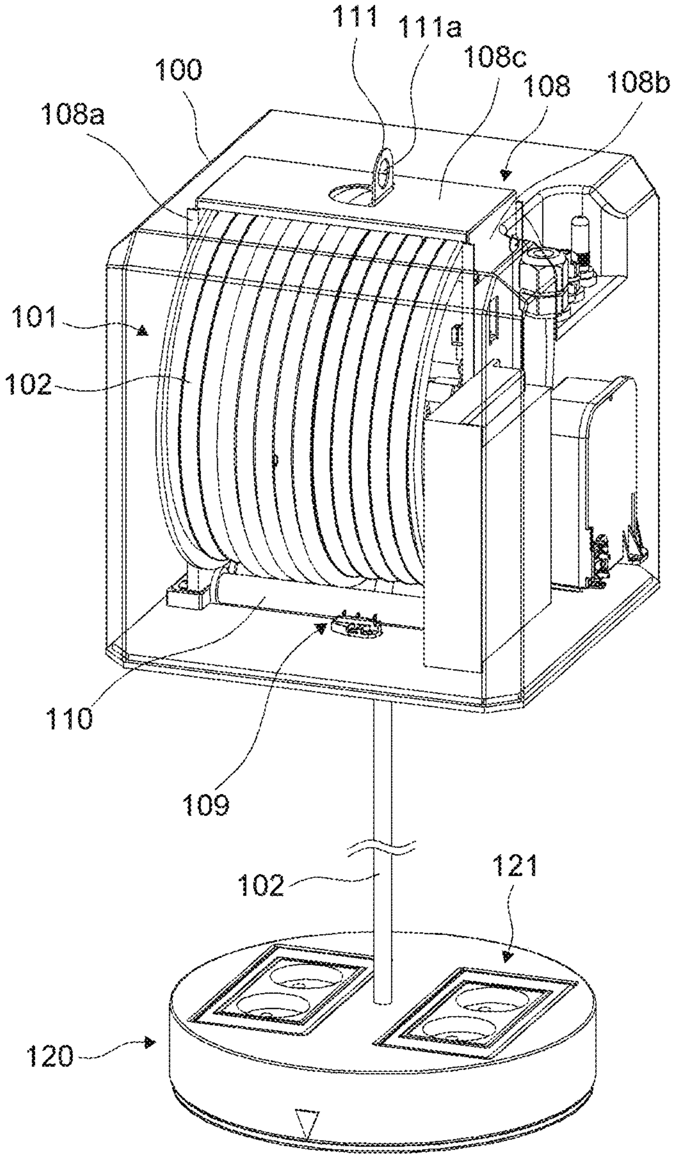
FIG. 3 is a see-through perspective view illustrating a state in which an elevating body in FIG. 1 is lowered.
Figure 4:
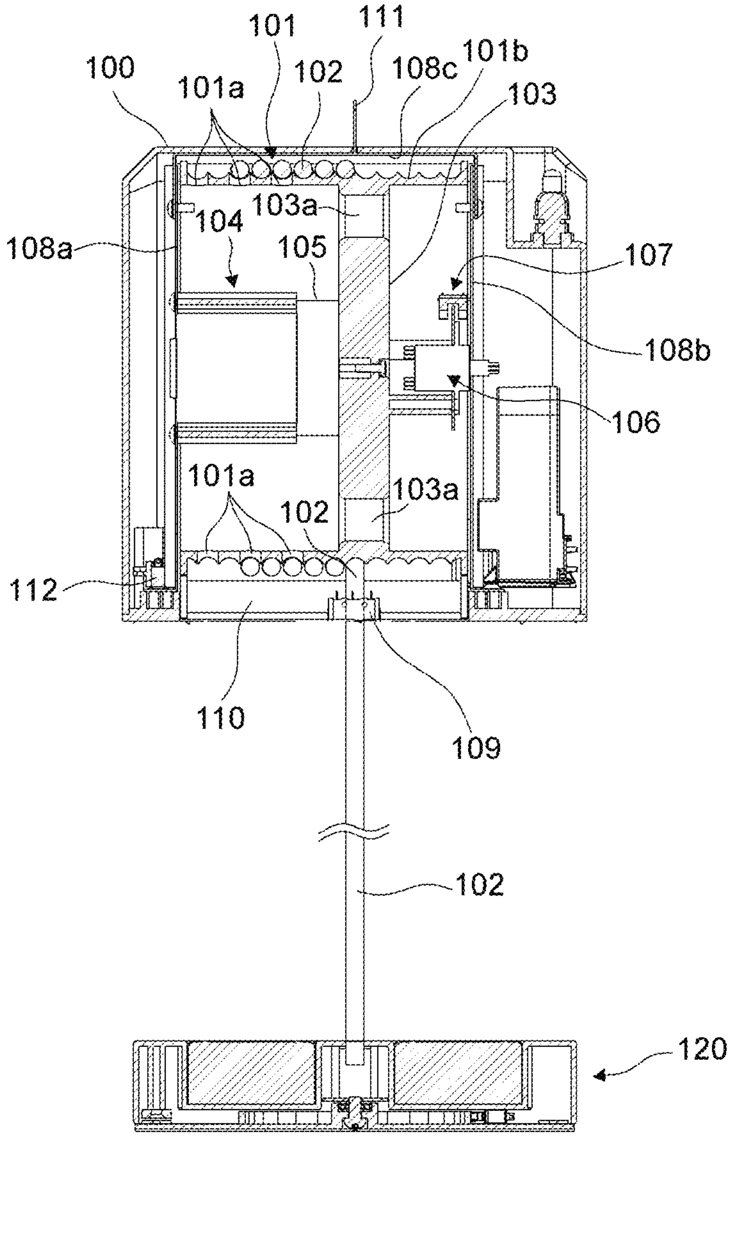
FIG. 4 is a cross-sectional view of FIG. 3.

FIG. 1 is a see-through perspective view of an elevating cable reel of single-layer winding type according to a preferred embodiment of the present invention, FIG. 2 is a cross-sectional view of FIG. 1, FIG. 3 is a see-through perspective view showing a state in which the elevating body in FIG. 1 is lowered, and FIG. 4 is a cross-sectional view of FIG. 3.

By referring FIGS. 1 to 4, the elevating cable reel of single-layer winding type according to a preferred embodiment of the present invention includes a main body 100 installed in a high place such as a ceiling etc., a drum 101 rotatably housed inside the main body 100, a drive motor 104 fixed to the main body 100 and providing rotational force to the drum 101, a gear unit 105 that reduces the rotational speed of the drive motor 104 and transmits it to the drum 101, and an elevating body 120 suspended from the power cable 102 and capable of being lifted up and down.

The main body 100 is installed on a ceiling or a wall inside a building, or a support having a predetermined shape, such as or a pole or a building pillar. The shape of the main body 100 is not limited to the example shown in the figures and can be variously modified. Inside the main body 100, a storage space capable of accommodating the drum 101 is provided.

The drum 101 is rotatably accommodated inside the main body 100, and a power cable 102 is wound around the circumferential surface thereof. A total length of the power cable 102 wound around the drum 101 can be variously selected in response to a installation environment. It is preferable in terms of electrical safety that the power cable 102 be completely released from the drum 101 when the elevator 120 is completely lowered to a required position.

Inside the drum 101, a hollow and a partition wall 103 blocking the hollow are formed. That is, the drum 101 has a structure in which hollows are formed on both sides of the partition wall 103.

As shown in FIG. 1, when the power cable 102 is completely wound around the drum, the final turn TL of the power cable 102 is aligned on the same vertical line A as the center of the main body 100. A location of the drum 101 relative to the main body 100 or a location of the winding start point of the power cable 102 is determined as a point that satisfies these alignment conditions. According to this configuration, when the elevating body 120 is elevated completely by the completion of winding of the power cable 102 and coupled to the lower part of the main body 100, the center of the elevating body 120 is exactly aligned with the center of the main body 100, and a interior aesthetics can be maximized by the configurations.

The slip ring 106 is a member disposed on the other side of the partition wall 103, that is, on the right side of the partition wall 103, and receives commercial power in a contact manner. The slip ring 106 is configured to receive commercial power by slipping and rotating while a pair of contacts continuously maintain contact with each other when the drum 101 rotates. One side of the slip ring 106 is fixed to one vertical plate 108*b* of a bracket 108 described later.

At least one wire through-hole 103*a* is formed in the partition wall 103 in the thickness direction. Therefore, the core wire whose sheath is removed at the end of the power cable 102 are introduced into the hollow of the drum 101 through a position adjusting hole 101*a* formed in the drum 101 and pass through the wire through-hole 103*a* to connect the slip ring 106. Alternatively, a separate connection line may be added between the input end of the power cable 102 and the slip ring 106.

An optical sensor 107 is disposed on one side of the periphery of the slip ring 106 to detect an amount of rotation of the drum 101. The light emitting element and the light receiving element of the optical sensor 107 are disposed facing each other with an edge of the slip ring 106 interposed therebetween.

On the outer circumferential surface of the drum 101, a guide groove 101*b* accommodating a part of the circumferential surface of the power cable 102 is formed to spirally extend along the longitudinal direction of the drum 101 so that the power cable 102 is wound at a constant pitch.

A position adjusting hole 101*a* that communicates with the hollow of the drum 101 and serves as a starting point for the power cable 102 to wind around the outer circumferential surface of the drum 101 is formed in at least one location of the guide groove 101*b*. A plurality of position adjusting holes 101*a* are alternately formed in guide grooves 101*b* that are repeated in the longitudinal direction of the drum 101.

The power cable 102 is wound in a single layer on the circumferential surface of the drum 101, and a starting point of winding on the circumferential surface of the drum 101 can be selected in consideration of an entire length of the power cable 102.

The position adjusting holes 101_a_ are formed to be staggered in multiple directions with respect to an axis of rotation of the drum 101. According to this configuration, there is an effect of securing a rigidity of the drum 101 by distributing the length section of the drum 101 in which the position adjusting hole 101_a_ is formed. In this regard, FIGS. 2 and 4 show an example in which the position adjusting holes 101_a_ are formed in the first, third, and fifth grooves in the upper portion of the drum 101, and the position adjusting hole 101_a_ are formed in the second, fourth, and sixth grooves in the lower portion of the drum 101.

A lift-stop limit switch 109 is fixed to an inner bottom surface of the main body 100 and a part of it penetrates the lower surface of the main body 100 and is exposed to the outside, so that when the lift of the elevating body 120 is completed, the lift-stop limit switch 109 is operated by contacting the upper surface of the elevating body 120. When the lift-stop limit switch 109 is operated, a predetermined microcomputer (not shown) stops the driving motor 104 to stop the winding.

A guide roll 110 is fixed to the inner bottom surface of the main body 100, and at least one is disposed under the drum 101 to guide the power cable 102 released from the drum 101 to below of the main body 100.

Additionally, a no-load limit switch 112 may be connected to a rotation shaft of the guide roll 110. The no-load limit switch 112 can detect a landing state of the elevating body 120 by detecting a tension applied to the power cable 102 released from the drum 101. For example, when the elevating body 120 is lowered by supplying power to the driving motor 104, if the elevating body 120 reaches a ground and the tension decreases, the tension applied to the guide roll 110 changes, and then the no-load limit switch 112 is activated.

A bracket 108 having a substantially Π shape arranged to surround the drum 101 is fixed at the bottom of the main body 100, and an assembly of the drum 101, the driving motor 104, and the gear unit 105 is sustained. The bracket 108 is composed of a pair of vertical plates 108_a_ and 108_b_ and a horizontal plate 108_c_ connecting upper ends of the pair of vertical plates 108_a_ and 108_b_ to each other. A pair of vertical plates 108_a_ and 108_b_ are correspondingly disposed at both ends of the drum 101. A rear end of the driving motor 104 is bolted and fixed to one 108_a_ of the pair of vertical plates 108_a_ and 108_b_, and one side of the slip ring 106 and the optical sensor 107 are connected to the other one 108_b_.

The mounting piece 111 is a fastening member for installing the main body 100 to a ceiling or wall or a support of a predetermined shape. The mounting piece 111 is formed by cutting and bending a part of a middle point of the horizontal plate 108_c_ and protruding out of the upper surface of the main body 100. A fastening hole 111_a_ is formed in the mounting piece 111 to pass a fastening element such as a bolt or piece.

The driving motor 104 is directly or indirectly fixed to the main body 100 and disposed in the hollow of one side of the drum 101. A gear unit 105 consisting of a reduction gear assembly that reduces rotational speed of the driving motor 104 and transmits the rotational force to the drum 101 is connected to a rotation shaft of the driving motor 104. The output end of the gear unit 105 is inserted into a center of one surface of the partition wall 103 to transmit the rotational force to the drum 101.

The driving motor 104 is consist of a direct current (DC) motor, and if the elevating body 120 does not reach its own load or a predetermined tensile force when the elevating body 120 is stopped, both ends of a power input terminal of the driving motor 104 are shorted or a braking resistor with a predetermined resistance value is connected between the both ends so as not to rotate the drum 101.

Alternatively, a reduction gear ratio of the gear unit 105 is sufficiently large so that the drum 101 does not rotate in case the elevating body 120 does not reach its own load or a predetermined tensile force when the elevating body 120 is stopped.

The driving motor 104 may be configured to lower the elevating body 120 by actively rotating by a power source when a predetermined high load or a large force greater than a tensile force is applied to the elevating body 120. Preferably, a DC motor may be employed as the driving motor 104.

A microcomputer (not shown) in charge of controlling the driving motor 104 detects no-load and overload conditions applied to the driving motor 104 and performs a control to automatically stop the operation of the driving motor 104. To this end, an encoder (not shown) for detecting the amount of rotation of the driving motor 104 may be installed on one side of the driving motor 104. The microcomputer can detect the rotational speed of the driving motor 104 from a count value of the encoder, and determine a no-load or overload state therefrom.

The microcomputer may additionally perform a slow section control to prevent impact between the main body 100 and the drum 101 by reducing the rotational speed of the drum 101 before the elevating body 120 rises and engages with the main body 100. At this time, the microcomputer outputs a pulse signal to the driving motor 104 and repeats on/off to control the elevating body 120 to gradually couple to the lower part of the main body 100.

In addition, the microcomputer may further perform an automatic stop control for stopping the operation of the driving motor 104 by detecting when the elevating body 120 reaches a height preset by a user. At this time, the microcomputer recognizes the position of the elevating body 120 from the amount of rotation detected by the encoder and outputs a control signal to stop the operation of the driving motor 104 when the elevating body 120 reaches a preset position. For example, in the case of a restaurant kitchen, since a floor is wet, the elevating body 120 may be set to automatically stop at several tens of centimeters (cm) from the floor.

The elevating body 120 may be composed of an electrical outlet suspended from the power cable 102 and provided with at least one plug insertion hole 121 on one surface. Preferably, the elevating body 120 is made of a disc-shaped plastic injection molding. According to this configuration, when the elevation is completed, the elevating body 120 is in close contact with the center of the lower surface of the main body 100, so the overall device can be configured compactly.

The elevating body 120 has a configuration in which the power cable 102 is introduced to the center of the upper surface and a plurality of plug insertion holes 121 are symmetrically disposed on both sides with respect to the center. That is, the elevating body 120 is configured such that the plug insertion holes 121 of the electrical outlets are exposed to the upper surface of the disk structure. According to this configuration, when the elevation of the elevating body 120 is completed and the upper surface of the elevating body 120 is coupled to the lower portion of the main body 100, the plug insertion holes 121 are not exposed to the outside, which is advantageous in terms of electrical safety and interior aesthetics.

A wireless charging unit (not shown) is built into the elevating body 120 and supplies wireless power to one surface (preferably, the top surface) of the elevating body 120 by electromagnetic induction or resonance induction to provide a wireless charging function for a predetermined portable electronic device such as a cell phone etc. positioned on the elevating body 120.

The elevating cable reel of single-layer winding type having the above configurations can be applied to multi-use facilities such as schools, restaurants, cafes, and pubs, etc. The elevating cable reel of single-layer winding type is installed on preferably a ceiling to correspond to each table and to charge portable electronic devices such as cell phones, laptops, touch pads, etc. or to provide an electrical outlets that is fastened with a plug of device such as various testing device, heating appliance, video conferencing devices etc.

A user can lower the elevating body 120 as shown in FIGS. 2 and 4 by operating the elevating cable reel of single-layer winding type with a wired or wireless remote controller. The elevating body 120 may be used by inserting a plug of a device requiring power supply into the plug insertion hole 121 after being placed in the air above the table or landed on the table surface. Alternatively, the user may lift down the elevating body 120 by pulling downward with a hand. At this time, the elevating cable reel of single-layer winding type does not descend if the load or tensile force determined by the braking resistance or gear reduction ratio is not reached, so safety accidents can be prevented.

When a power use is finished, the user can operate the wired or wireless remote controller to raise the elevating body 120 and return it to the ceiling as shown in FIGS. 1 and 3. The elevating body 120 rises by the winding operation of the driving motor 104 and when it reaches the lower surface of the main body 100, the upper surface thereof contacts the lift stop limit switch 109 to stop the lift. By selecting the position adjusting hole 101*a* properly to match the length of the power cable 102 in the setting process before use, the power cable 102 is wound in a single layer on the circumferential surface of the drum 101 at the end of the elevation of the elevating body 120, and finish the winding at the center of the drum 101. In addition, it is possible to prevent a load applied to the elevating body 120 from being biased to one side.

The elevating body 120 comes into close contact to the center of the lower surface of the main body 100 when the elevation is completed. The lower surface of the elevating body 120 may be buried parallel to the surface of the ceiling, or alternatively, it may be installed in an exterior type so as to protrude.

Figure 5:
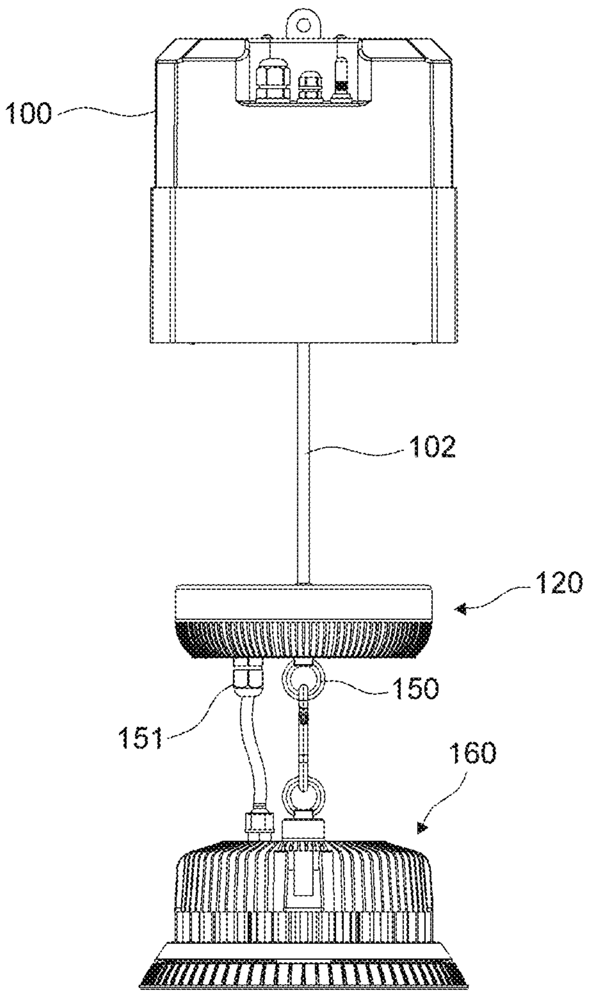
FIG. 5 is a side view illustrating a modified example of FIG. 4.
Figure 6:
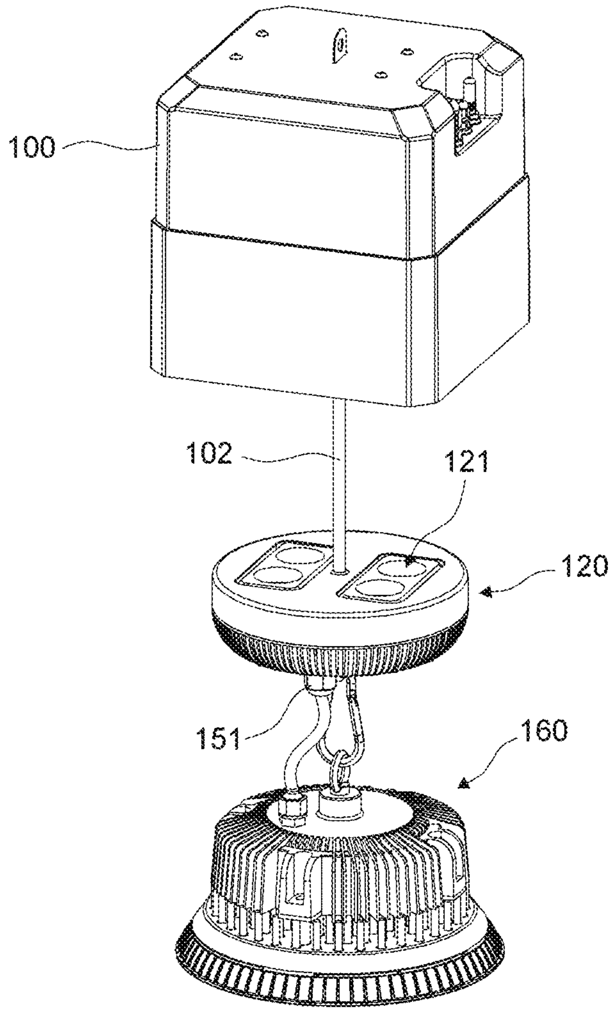
FIG. 6 is a perspective view of FIG. 5.

As shown in FIGS. 5 and 6, an eye bolt 150 is fastened to the center of the elevating body 120 and a cable connector 151 is fastened to a periphery of the elevating body 120 so that an electric device such as a light 160 can be conveniently installed at the bottom of the elevating body 120.

Figure 7:
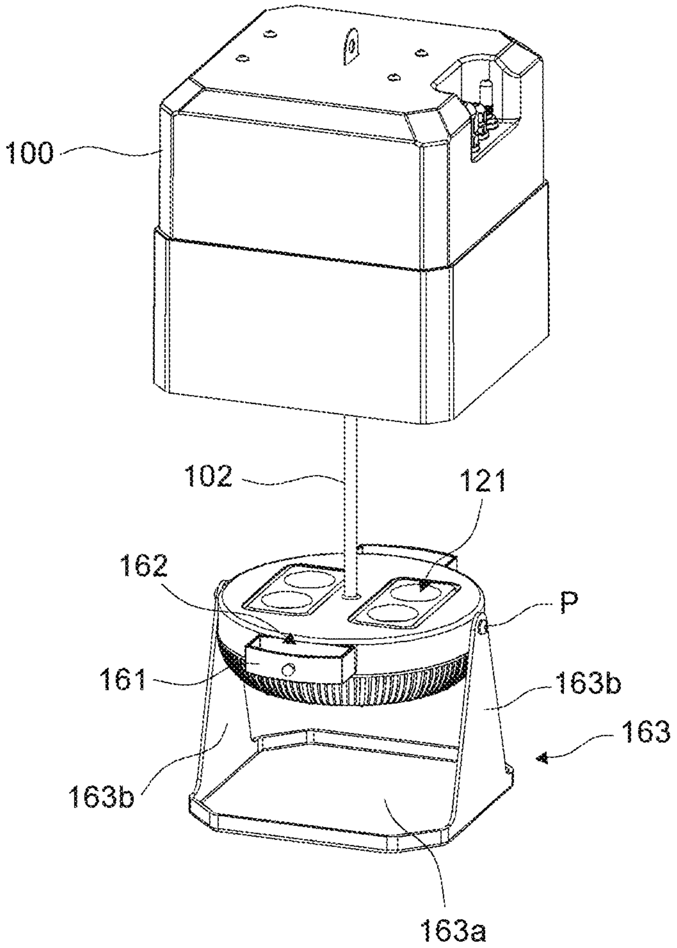
FIG. 7 is a perspective view showing a modified example of FIG. 6.

As shown in FIG. 7, a storage unit 161 is installed on at least one side of the elevating body 120 and is installed to selectively open an internal storage space 162. As shown in the figure, the storage unit 161 may be configured in a drawer type, alternatively, it may be configured in a pop-up type that is selectively rotated and protrudes. A predetermined spring (not shown) may be connected to the storage unit 161 to apply an elastic force in a direction to the elevating body 120. In the internal storage space 162 of the storage unit 161, for example, household items such as toothpicks, bottle openers, air fresheners, candies, and the like may be stored.

A multi-purpose shelf 163 is disposed under the elevating body 120, and includes a storage surface 163*a* on which an object can be placed and a pair of support plates 163*b* extending upward from the storage surface 163*a*. The ends of the pair of support plates 163*b* are connected to both side surfaces of the elevating body 120 by pivots P so that they can be freely shaken. Objects such as a card checker, a vehicle electric charging cord, a speaker, a camera, and the like may be placed on the storage surface 163*a*. Even if a center of gravity of these objects is biased to one side of the storage surface 163*a*, stable storage is possible by the multi-purpose shelf 163 since the multi-purpose shelf 163 is always suspended from the elevating body 120 in the direction of gravity by the pivots P.

Figure 8:
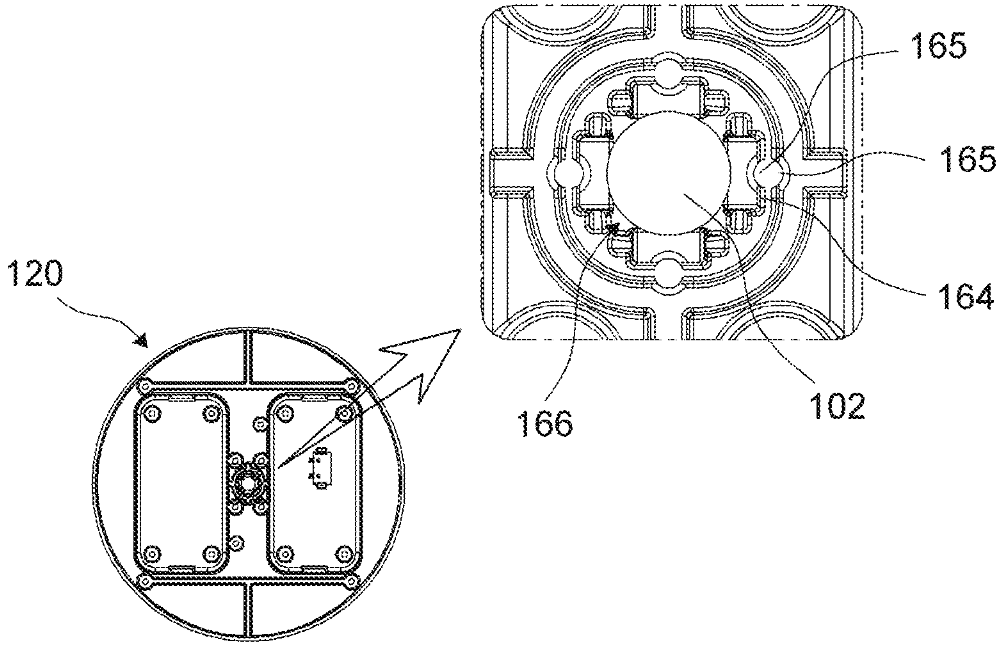
FIG. 8 is a bottom view illustrating a lower configuration of the elevating body in FIG. 7.

FIG. 8 shows a bottom configuration of the elevating body 120. As shown in the figure, if the power cable 102 is inserted into a cable hole 166 located at the center of the elevating body 120, the power cable 102 can be firmly fixed to the elevating body 120 by moving compression blocks 164 surrounding the power cable 102 in all sides to the direction of the power cable 102. To this end, semicircular bolt holes 165 corresponding to each other are formed on an outer surface of each compression block 164 and an inner circumferential surface of the circular rib of the corresponding elevating body 120. Therefore, when a predetermined bolt is selectively inserted into the bolt hole 165 and tightened, the end of the bolt contacts the compression block 164 and the compression block 164 is pushed inward to press the power cable 102, thereby compressing the power cable 102. Accordingly, the power cable 102 can be firmly fixed to the elevating body 120.

FIGS. 9 to 14 show an elevating cable reel of single-layer winding type according to another embodiment of the present invention. In the figures, the same reference numerals as those of the above-described embodiment correspond to the same components, and thus detailed description thereof will be omitted.

Figure 13:
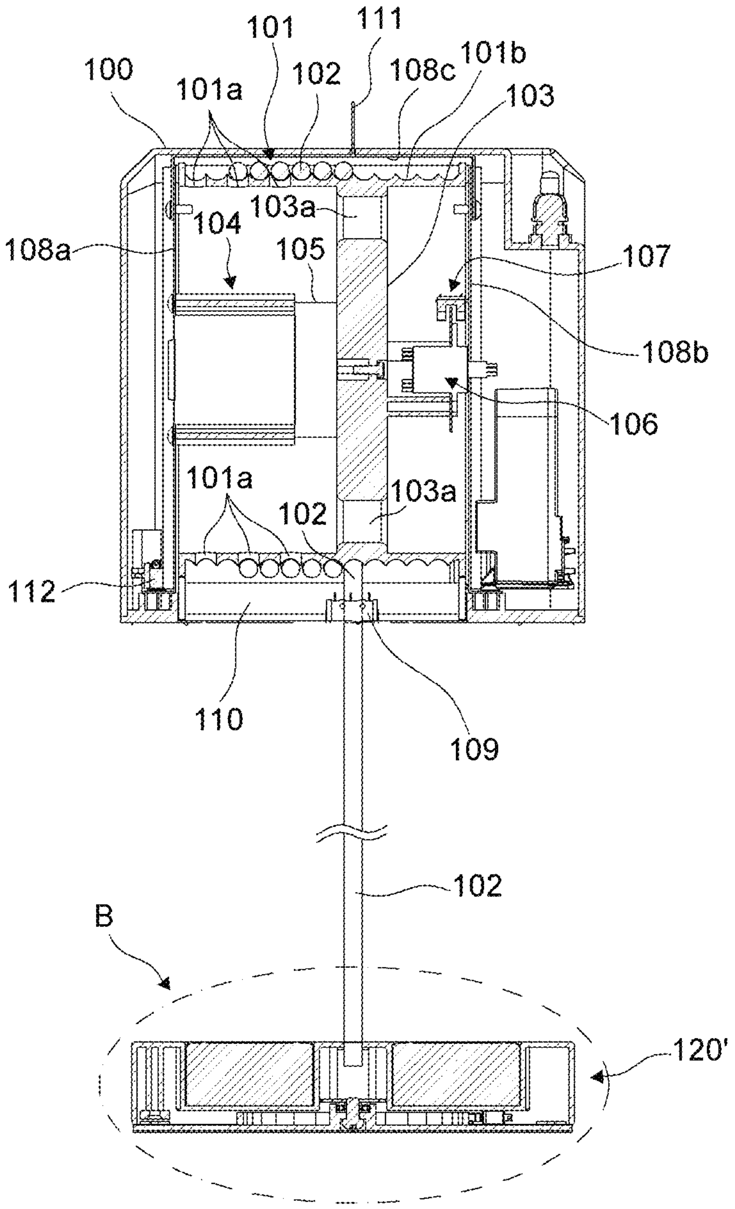
FIG. 13 is a cross-sectional view of FIG. 12.
Figure 14:
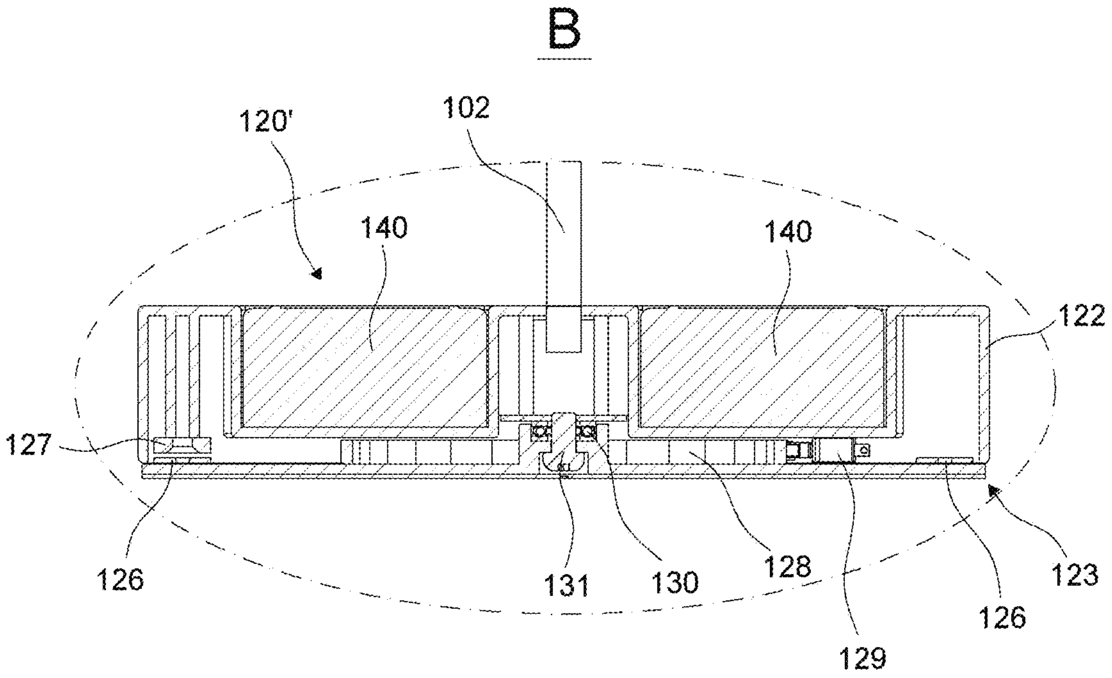
FIG. 14 is an enlarged view of part 'B' in FIG. 13.

As shown in 'B' of FIGS. 13 and 14, the elevating body 120' is composed of an elevating main body 122 suspended on the power cable 102, and a rotating game device comprising a rotating plate 123 assembled to be rotated on one surface (preferably, the lower surface) of the elevating main body 122.

The elevating main body 122 is made of a disc-shaped plastic injection molding or a lightweight aluminum material. According to these configurations, when the elevation is completed, the elevating main body 122 contacts closely to the center of the lower surface of the main body 100 and can be easily embedded or contact closely to the ceiling, so that the overall device can be compact.

The rotating plate 123 is rotatably installed on the lower surface of the elevating main body 122. For smooth rotation of the rotating plate 123, a ball bearing 130 is interposed between the rotating plate 123 and the elevating main body 122, and a fixing bolt 131 fixed by being inserted into the inner ring of the ball bearing 130 at the center of the rotating plate 123 is fastened. In a plane portion of the rotating plate 123, betting area portions 124 distinguished from each other by at least one selected from among phrases, numbers, images, and colors are formed to be partitioned in the circumferential direction. Betting area portions 124 may be printed with various contents corresponding to the type of game. For example, phrases such as 'one shot!', 'sing!', 'kiss me!', 'pay!', 'win!', etc. may be written.

Figure 10:
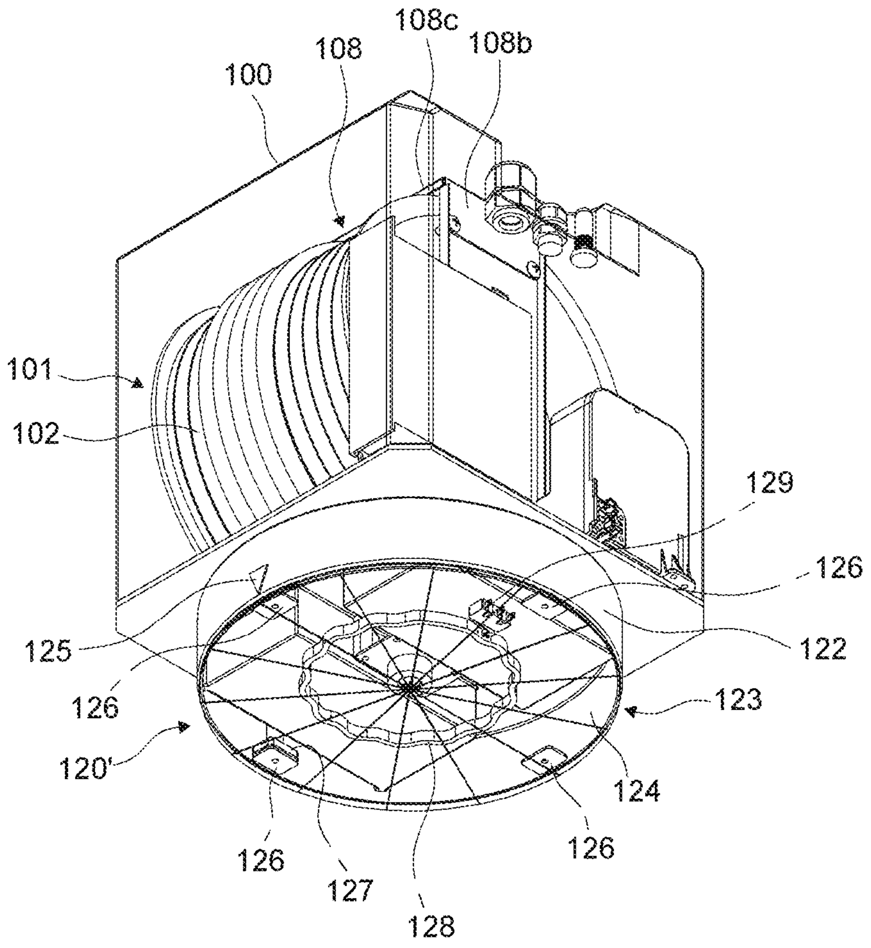
FIG. 10 is a see-through perspective view showing a detailed structure of the elevating body in FIG. 9.

As shown in FIG. 10, a rotary member 128 is fixed to the upper surface of the rotary plate 123 that is not exposed to the outside, and a sensing member 129 for detecting rotation amount such as speed etc., of the rotary plate 123 by contacting the rotary member 128 is correspondingly fixed on the elevating main body 122. The rotary member 128 has a rotation center coincident with the center of the rotation plate 123 and has a structure in which valleys and crests are repeatedly formed at a predetermined pitch along a substantial circular circumference. The sensing member 129 is composed of a limit switch, and when the rotating plate 123 rotates, a roller part thereof maintains contact with the valley and the crest of the rotary member 128. Alternatively, through-holes are repeatedly formed at regular intervals along the circumference of the rotary member 128, and the sensing member 129 may be composed of an optical sensor facing the through-holes.

To control a deceleration of the rotating plate 123, an electromagnet 127 is fixed to one side of the lower part of the elevating body 122, and a magnetic member 126 that can face the electromagnet 127 during rotation is provided on the upper surface of the rotating plate 123. Here, the magnetic member 126 is composed of a ferromagnetic material such as an iron plate or a permanent magnet, and magnetically interacts with the electromagnet 127. When power is supplied to the electromagnet 127 while the rotating plate 123 is rotating, and the electromagnet 127 has magnetism of a predetermined intensity, the rotation is hindered and deceleration is promoted by an attractive force acting between the electromagnet 127 and the magnetic member 126.

A rotating game artificial intelligence microcomputer (not shown) is built into the elevating main body 122, and a predetermined identification protrusion (or identification groove) provided at one point of the rotary member 128 is used as a reference to calculate the rotation period and speed. When a user turns the rotating plate 123, the rotating game artificial intelligence microcomputer predicts a result based on empirical data for a stop position for each rotation speed, and control the electromagnet 127 to use the magnetic force acting between the electromagnet 127 and the magnetic member 126 to control stop position to perform deceleration control according to a machine learning algorithm. That is, if the rotating plate 123 is rotated by a force of F1 and stopped after, for example, 10 rotations when the deceleration control is not performed, it can be controlled to stop after for example 7.5 rotations by the rotation of the same force F1 by the artificial intelligence microcomputer's control on the electromagnet 127. The artificial intelligence microcomputer learns based on empirical data about a stop position ($P_1$, $P_2$, $P_3$, . . . $P_n$) corresponding to a rotation period and each rotation speed ($V_1$, $V_2$, $V_3$, . . . $V_n$) of the rotating plate 123, and for example, when the rotational speed of the rotating plate 123 is $V_7$, the $P_7$ value is predicted as the stop position. At this time, if a betting area 124 corresponding to $P_7$ is to be avoided or another specific betting area 124 correspond to $P_7$ is to be chosen, the artificial intelligence microcomputer controls to decelerate the rotating plate 123 using the electromagnet 127 to stop the desired betting area portion 124 at a position where a fixed mark 125 is located. The artificial intelligence microcomputer performs learning by accumulating control or empirical data for the electromagnet 127.

The elevating cable reel of single-layer winding type having the above configurations can be applied to multi-use facilities such as restaurants, cafes, pubs, picnic halls, and pensions. The elevating cable reel of single-layer winding type is installed to correspond to each table, preferably installed on a ceiling, and descends when necessary to provide game or event services.

Figure 12:
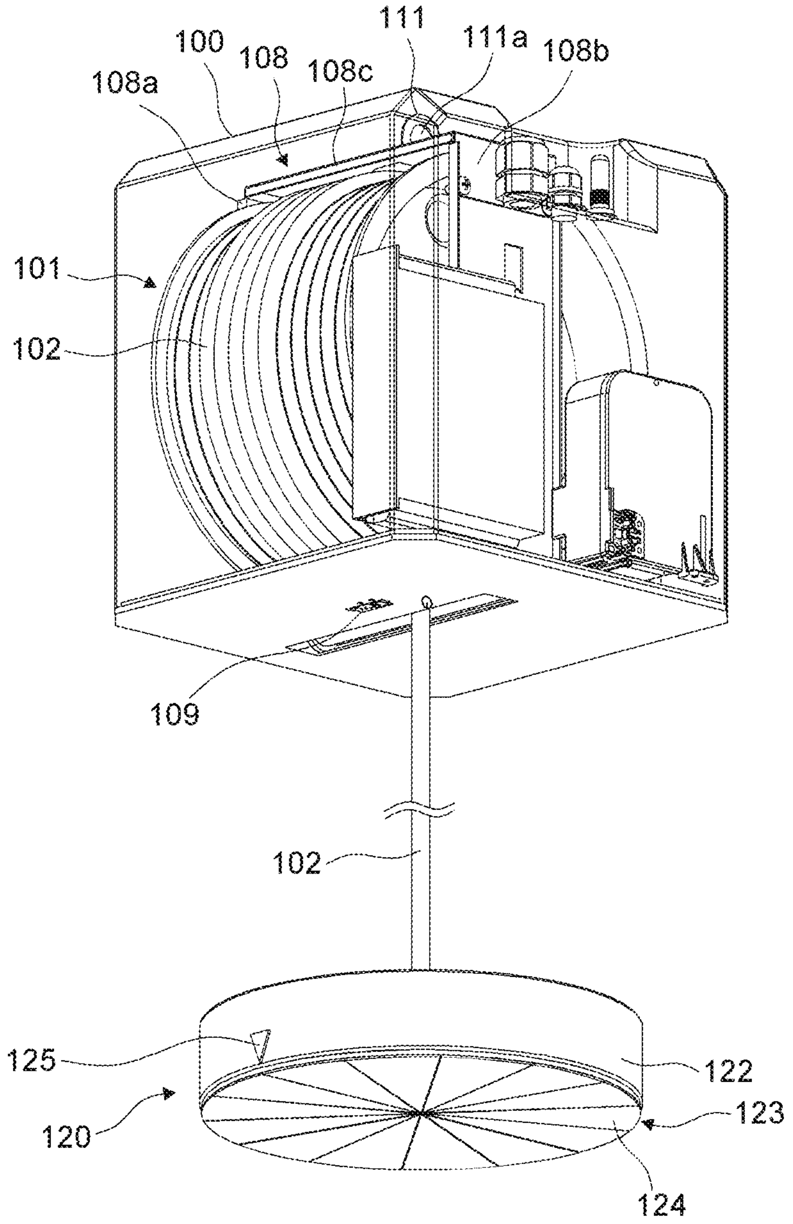
FIG. 12 is a see-through perspective view illustrating a state in which the elevating body in FIG. 9 is lowered.

A user can lower the elevating body 120', as shown in FIGS. 12 and 13, by operating the elevating cable reel of single-layer winding type with a wired or wireless remote controller. The elevating body 120' can be placed in the air above a table or landed on a surface of the table. Alternatively, the user may lower the elevating body 120' by pulling it downward with a hand. At this time, the elevating cable reel of single-layer winding type detects an amount of rotation of the driving motor 104 to automatically stop the driving motor 104 when necessary, such as no load, overload, or reaching a set position, thereby preventing safety accidents.

After lowering the elevating body 120', the user grabs the elevating main body 122 or the power cable 102 and turns it over so that the rotating plate 123 on the lower surface of the elevating body 120' faces upward and the user can flip a flat part of the rotating plate 123 to rotate it with his finger.

In the betting area 124 of the rotating plate 123, various game or event phrases are pre-printed or engraved. For example, event-type phrase such as 'one shot!' or 'kiss!' etc. can further enhance an atmosphere and add joy to friends' gatherings or wedding receptions. In addition, in this case, the manager of the elevating cable reel of single-layer winding type can secretly operates the deceleration control function of the artificial intelligence microcomputer, so that no matter how a protagonist of the meeting turns the rotating plate 123, a specific betting area 124, for example, 'Kiss me!' stops at the position where the fixed mark 125 is located by actively controlling the deceleration of the rotary plate 123 so that greater pleasure can be given to the participants of the meeting.

In addition, when charging a mobile device such as a cell phone etc. is required, the plug insertion hole of the outlet exposed on the upper surface of the elevating body 122 may be used, or the wireless charging function may be used by placing the mobile device on one side of the upper surface of the elevating body 122.

Figure 9:
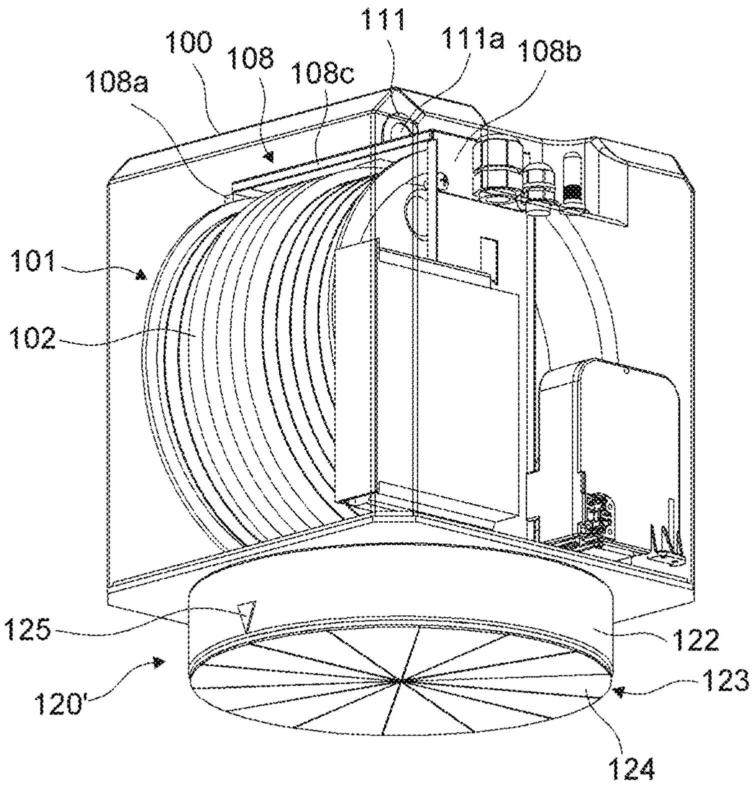
FIG. 9 is a see-through perspective view of an elevating cable reel of single-layer winding type according to another embodiment of the present invention.
Figure 11:
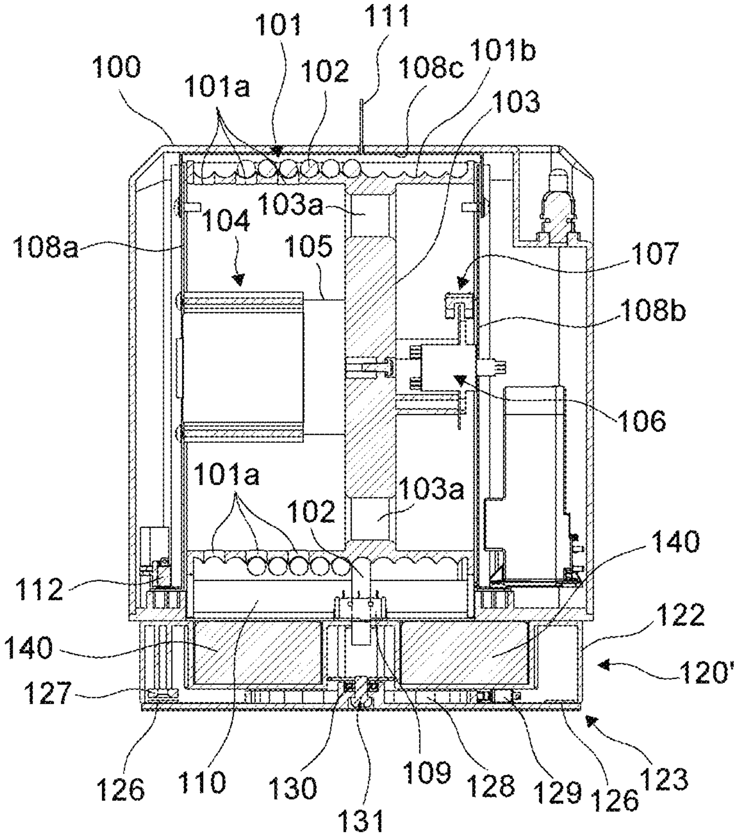
FIG. 11 is a cross-sectional view of FIG. 9.

When the game ends, the user can manipulate the wired or wireless remote control to raise the elevating body 120' and return it to the ceiling as shown in FIGS. 9 to 11. The elevating body 120' rises by the winding operation of the driving motor 104, and when it reaches the lower surface of the main body 100, the upper surface thereof contacts the lift stop limit switch 109 to stop the lift. The power cable 102 can be precisely positioned so that the winding of the power cable 102 is finished at the center of the drum 101 when the elevation of the elevating body 120' is completed by selecting the position adjusting hole 101*a* in the setting process before use to prevent the load applied to the elevating body 120' from being biased to one side.

After the end of the game, by raising the elevating body 120' to the ceiling, space utilization efficiency can be increased and interior aesthetics can be improved.

Although the present invention has been described above with limited examples and drawings, the present invention is not limited thereto, and, of course, various modifications and variations are possible within the technical spirit of the present invention and the equivalent scope of the claims described below by those skilled in the art to which the present invention belongs.

INDUSTRIAL APPLICABILITY

When the present invention can provide an elevating power supply that is installed on a ceiling of various multi-use facilities to charge portable electronic devices such as cell phones, laptops, touch pads, etc. or to be conveniently and neatly connected with plugs of devices such as laboratory equipment, electric heaters, and video conferencing devices. In addition, a multi-purpose shelf is installed on the elevating body to use outlet, lighting, card checker, car electric charging cord, speaker, and camera etc. in an elevating type conveniently, and if the storage unit is configured on the elevating body, household items such as toothpicks, bottle openers, air fresheners, candies, and the like can be neatly stored. If the present invention is applied to an amusement facility, the rotating game device is installed on the ceiling of a multi-use facility so that the game can be enjoyed at each table, and after the game is over, the rotating game device is raised to the ceiling to increase space utilization efficiency.

What is claimed is:

1. An elevating cable reel of single-layer winding type comprising:

a main body installed on a ceiling or wall or a support of a predetermined shape and having a storage space therein;

a drum rotatably accommodated inside the main body, and having a hollow therein, and a power cable being wound around a circumferential surface thereof;

a driving motor disposed in the hollow to provide forward/reverse rotational force to the drum;

a slip ring installed on a part of the drum to receive commercial power in a contact manner; and an elevating body suspended from a lower end of the power cable and installed to be elevated up and down, wherein the power cable is wound in a single layer on the circumferential surface of the drum to prevent heat generation due to eddy current, wherein a guide groove accommodating a part of an outer circumferential surface of the power cable is formed on the circumferential surface of the drum to spirally extend along a longitudinal direction of the drum at a constant pitch so as to wind the power cable at a constant pitch, wherein at least one location of the guide groove is formed with a position adjusting hole that communicates with the hollow of the drum and serves as a starting point for winding the power cable around the circumferential surface of the drum, wherein in order to select a starting point of winding on the circumferential surface of the drum in response to an entire length of the power cable, a plurality of position adjusting holes are formed in the guide groove, wherein the plurality of position adjusting holes are alternately formed for the guide groove that extends spirally along the longitudinal direction of the drum, and wherein in order to secure a rigidity of the drum, the position adjusting holes are formed to be staggered in multiple directions with respect to a rotation axis of the drum.

2. An elevating cable reel of single-layer winding type comprising:

a main body installed on a ceiling or wall or a support of a predetermined shape and having a storage space therein;

a drum rotatably accommodated inside the main body, and having a hollow therein, and a power cable being wound around a circumferential surface thereof;

a driving motor disposed in the hollow to provide forward/reverse rotational force to the drum;

a slip ring installed on a part of the drum to receive commercial power in a contact manner; and an elevating body suspended from a lower end of the power cable and installed to be elevated up and down, wherein the power cable is wound in a single layer on the circumferential surface of the drum to prevent heat generation due to eddy current, wherein a guide groove accommodating a part of an outer circumferential surface of the power cable is formed on the circumferential surface of the drum to spirally extend along a longitudinal direction of the drum at a constant pitch so as to wind the power cable at a constant pitch, wherein at least one location of the guide groove is formed with a position adjusting hole that communicates with the hollow of the drum and serves as a starting point for winding the power cable around the circumferential surface of the drum, wherein in order to select a starting point of winding on the circumferential surface of the drum in response to an entire length of the power cable, a plurality of position adjusting holes are formed in the guide groove, wherein the elevating body is an outlet provided with at least one plug insertion hole, wherein the elevating cable reel of single-layer winding type further comprises a multi-purpose shelf connected to both side surfaces of the elevating body by pivots to be disposed below the elevating body, and wherein the multi-purpose shelf has a storage surface on an upper surface thereof where an object can be placed.

3. An elevating cable reel of single-layer winding type comprising:

a main body installed on a ceiling or wall or a support of a predetermined shape and having a storage space therein;

a drum rotatably accommodated inside the main body, and having a hollow therein, and a power cable being wound around a circumferential surface thereof;

a driving motor disposed in the hollow to provide forward/reverse rotational force to the drum;

a slip ring installed on a part of the drum to receive commercial power in a contact manner; and an elevating body suspended from a lower end of the power cable and installed to be elevated up and down, wherein the power cable is wound in a single layer on the circumferential surface of the drum to prevent heat generation due to eddy current, wherein a guide groove accommodating a part of an outer circumferential surface of the power cable is formed on the circumferential surface of the drum to spirally extend along a longitudinal direction of the drum at a constant pitch so as to wind the power cable at a constant pitch, wherein at least one location of the guide groove is formed with a position adjusting hole that communicates with the hollow of the drum and serves as a starting point for winding the power cable around the circumferential surface of the drum, wherein in order to select a starting point of winding on the circumferential surface of the drum in response to an entire length of the power cable, a plurality of position adjusting holes are formed in the guide groove, wherein the elevating body is composed of an elevating main body suspended on the lower end of the power cable, and a rotating game device comprising a rotating plate configured to be rotated on one surface of the elevating main body, and wherein the rotating plate has betting areas distinguished from each other and partitioned in the circumferential direction by at least one selected from among texts, numbers, images, and colors.

* * * * *